United States Patent Office 2,901,696
Patented Aug. 25, 1959

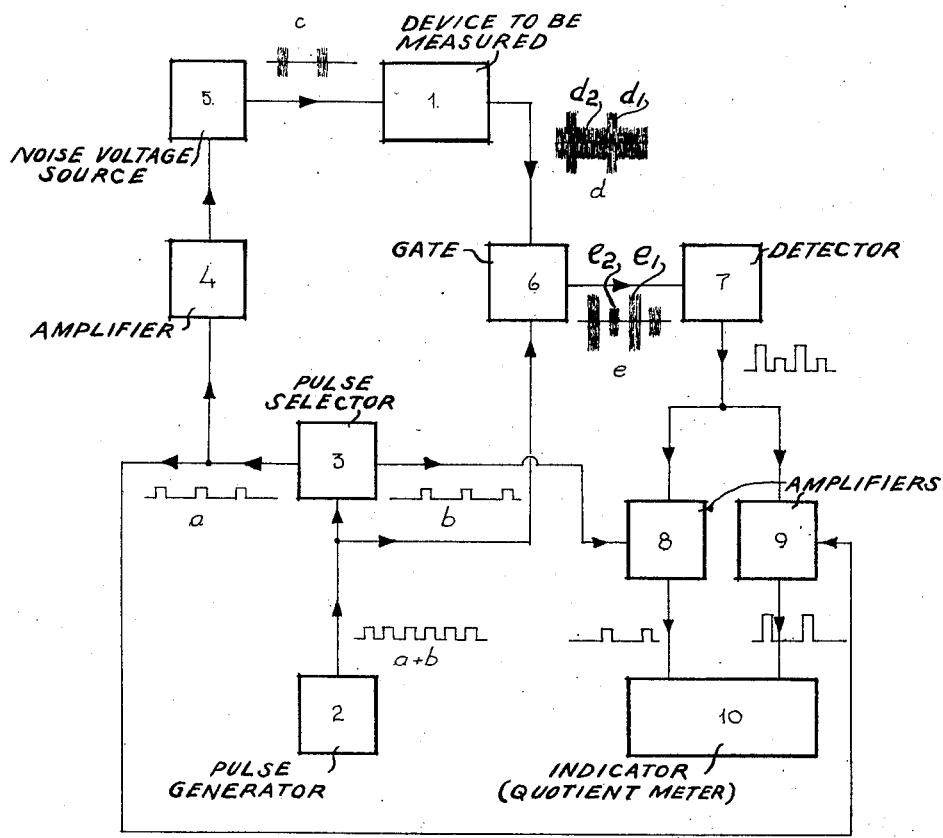

2,901,696

ARRANGEMENT FOR AUTOMATIC AND CONTINUOUS MEASURING OF THE NOISE FACTOR OF AN ELECTRIC DEVICE

Hans Gösta Mölifors, Stockholm, Sweden, assignor to Ingeniorsfirman Magnetic Ab, Stockholm, Sweden, a corporation of Sweden Application September 24, 1954, Serial No. 458,090

Claims priority, application Sweden November 25, 1953

2 Claims. (Cl. 324—57)

The present invention refers to an arrangement for automatic and continuous measuring of the noise factor of an electric device. It comprises a noise voltage source, controlled by a pulse generator, which noise voltage source is intended to supply a noise voltage in the shape of a pulse train to the input side of the electric device, and a measuring device for measuring the quotient between the output voltage of the electric device during time intervals when pulses appear and during time intervals when pulse spaces appear in said pulse train.

An arrangement according to the invention can be said to be characterized thereby, that said pulse generator is connected on one hand to the input side of the voltage source via a pulse selector for suppressing every second pulse of a pulse train coming from the pulse generator, on the other hand to the input side of a mixing device to which also the output side of the electric device is connected.

In general, the noise factor (figure) of an electrical device is defined in the following way:

The noise factor (F) equals the ratio:

$$\frac{\text{The input signal/noise power ratio}}{\text{The output signal/noise power ratio}}$$

or in symbols $$F = \frac{S_{in}/N_{in}}{S_{out}/N_{out}}$$

When measuring noise figure it is most convenient to use noise instead of a signal for $S_{in}$. This noise is generated in a noise source. The noise output of a noise source is defined as the ratio $$\frac{\text{Noise added to the input of electrical device}}{\text{Noise existing at the input of electrical device}}$$

or $S_{in}/N_{in}$ also termed "excess noise."

In the prior art teachings F is proportional to $S_{in}/N_{in}$. This means that F is obtained by the use of a variable noise source. $S_{in}/N_{in}$ is measured and yields F. Therefore, it is not possible (with 3 db attenuation) to measure the noise factor F of an electrical device, the noise factor of which is greater than the maximum output of the noise source.

In contradistinction to the above, in the present invention the noise factor may be written $$F = \frac{S_{in}/N_{in}}{S_{out}/N_{out}} = \frac{S_{in}/N_{in}}{P_{out}/N-1_{out}}$$

where $S_{out}+N_{out} \equiv P_{out}=$ total output power. For a circuit according to the invention, $S_{in}/N_{in}$ is held constant. Therefore, F is proportional to:

$$\frac{1}{P_{out}/N_{out}-1}$$

This means that F is obtained by use of a noise source with a constant and known noise output (for instance, a gas discharge tube), the quotient $P_{out}/N_{out}$ being measured in a quotient meter (cross current meter).

It is here possible to measure a noise factor F of an electrical device, the noise factor of which is greater than the noise output of the noise source.

The invention will be described more closely in connection with the accompanying drawing, which in principle shows a block scheme of an arrangement according to the invention.

In the drawing number 1 indicates the electric device, in the following called object to be tested, for example an amplifier, the noise factor of which one wishes to measure. A pulse generator 2 is arranged to generate a pulse train $a+b$ and is connected to a pulse selector 3, which has two output sides and is arranged to divide the pulse train $a+b$ into two separate pulse trains $a$ and $b$, each of them containing half the number of pulses and with three times broader pulse spaces between consecutive pulses compared with the original pulse train. One output side of the pulse selector 3 is connected to an amplifier 4 which in its turn is connected to a noise voltage source 5. The output side of the noise voltage source is connected to the input side of the object 1 to be tested, the output side of which via a gate 6 and a detector 7 is connected to a measuring device 8—9—10, which consists of two amplifiers, 8 and 9 respectively, and a quotient meter 10. The output side of the pulse generator 2 is also connected to the mixing device 6. The amplifiers 8 and 9 are both on their input side connected to the output side of the detector 7 and on their output side to a separate coil in the quotient meter 10. The amplifier 8 is connected to the second output side of the pulse selector 3 and is controlled by the pulse train $b$. The amplifier 9 is connected to the first output side of the pulse selector 3 and is controlled by the pulse train $a$.

The arrangement now described is intended to function in the following way.

The pulse train $a+b$, generated in the pulse generator 2, is brought to the pulse selector 3, where it is divided into two pulse trains, $a$ and $b$.

The pulse train $a$ controls on one hand the noise voltage source 5 (via the amplifier 4), on the other hand the amplifier 9. The pulse train $b$ controls the amplifier 8. The noise voltage source 5 emits to the object 1 to be tested a noise voltage $c$ in the shape of a pulse train with the same pulse width and pulse repeating frequency as the pulse train $a$. In the output side of the object 1 to be tested appears a composed noise voltage $d$, the shape of which is depending on the noise voltage $c$ as well as the internal noise voltage of the object 1 to be tested. This composed noise voltage and the pulse train $a+b$ give rise to a composed noise voltage pulse train $e$ in the gate 6, which pulse train can be said to be composed by a noise voltage pulse train generated from noise voltage source 5 and the object 1 to be tested, and a noise voltage pulse train generated from noise voltage solely from the object 1 to be tested. As will appear from the wave forms on the drawing, the long parts $d_1$ and $e_1$ of the pulse trains $d$ and $e$ correspond to $a$-pulses and the short parts $d_2$ and $e_2$ correspond to $b$-pulses. The two noise voltage pulse trains have the same pulse repeating frequency and equally large pulse spaces. Between two consecutive noise voltage pulses of the composed noise voltage pulse train there is a pulse space, the width of which is the same as the width of the pulse spaces of the pulse train $a+b$. The composed noise voltage pulse train is fed to the detector 7 which has quadratic characteristic. With the help of the pulse controlled amplifiers 8 and 9 every second direct current impulse from the output side of the detector 7 is fed to one of the coils of the quotient meter 10 and every second to the other coil.

On this account the quotient meter 10 can be calibrated direct for indicating the noise factor of the object 1 to be tested.

I claim:

1. A system for the automatic and continuous measuring of the noise factor of an electrical device comprising in combination a noise voltage source connected to the input of the electrical device and adapted to supply a noise voltage in the shape of a pulse train, a pulse generator connected to said noise voltage source to control the same, a measuring device for measuring the quotient between the output signal of the electrical device during time intervals when pulses appear and during time intervals when pulse spaces appear in the pulse train, a pulse selector interconnected between the said pulse generator and said noise voltage source to suppress every second pulse of the pulse train output from said pulse generator, and a gating device connected to the output of said pulse generator and to the output of said electrical device, the said measuring device connected to the output of said gating device.

2. A system according to claim 1, including two amplifiers interconnected in parallel between the said gating device and said measuring device, the said amplifiers separately connected to different outputs of the said pulse selector, one of said outputs transmitting the pulses to the noise voltage source and to one of the amplifiers and the other output transmitting every second pulse of the pulse train from said pulse generator to the other amplifier, the said amplifiers activated by the received pulses to transmit the output signal of the electrical device to the said measuring device.

References Cited in the file of this patent

UNITED STATES PATENTS

| | | |
|---|---|---|
| 2,620,438 | Cottsworth | Dec. 2, 1952 |
| 2,691,098 | Selove | Oct. 5, 1954 |

FOREIGN PATENTS

| | | |
|---|---|---|
| 569,279 | Great Britain | May 16, 1945 |

OTHER REFERENCES

"Journal of Scientific Instruments and Physics," September 1948, pp. 295–298.